United States Patent

[11] 3,632,118

| [72] | Inventor | Hans Herger<br>Ennetbaden, Switzerland |
|---|---|---|
| [21] | Appl. No. | 844,002 |
| [22] | Filed | July 23, 1969 |
| [45] | Patented | Jan. 4, 1972 |
| [73] | Assignee | Aktiengesellschaft Brown, Boveri & Cie<br>Baden, Switzerland |
| [32] | Priority | Aug. 9, 1968 |
| [33] | | Switzerland |
| [31] | | 12045/68 |

[54] DEVICE FOR MAKING A CENTERING AND SEALING JOINT BETWEEN HOT AND COLD PARTS OF A HOUSING
1 Claim, 1 Drawing Fig.

[52] U.S. Cl. .................................... 277/4, 277/26
[51] Int. Cl. ................................. F16j 9/00, F02f 5/00
[50] Field of Search ........................... 277/26, 236, 4, 57; 415/134, 135; 285/187; 103/111 C, 111 B

[56] References Cited
UNITED STATES PATENTS

| 3,497,046 | 2/1970 | Schilling | 277/57 X |
| 1,082,886 | 12/1913 | Ljungstrom | 415/134 |
| 2,674,844 | 4/1954 | Boyd et al. | 277/26 UX |
| 2,764,099 | 9/1956 | Wernert | 103/111 X |

FOREIGN PATENTS

| 695,223 | 9/1964 | Canada | 285/187 |

Primary Examiner—Samuel B. Rothberg
Attorney—Pierce, Scheffler & Parker

ABSTRACT: A device for making a combined centering and sealing joint between two axially spaced parts of a housing structure of a machine, such as a turbomachine, of which one part of the housing, such as the turbine runner housing, is hot and the other housing part, such as the bearing or compressor housing, is relatively colder, comprises a thin-walled cylindrical joint ring which extends between two cylindrical centering surface portions on the two housing parts and which is made of a material which has substantially the same coefficient of heat expansion as that of the hotter housing part. One end of the joint ring surrounds the centering surface on the hot part of the housing and the other end is surrounded by the centering surface on the colder part of the housing, and the joint ring exhibits such tolerances with respect to the centering surfaces that at least during operation of the machine the ends of the joint ring bear in sealing fashion against the centering surfaces as a result of the different amounts of thermal expansion.

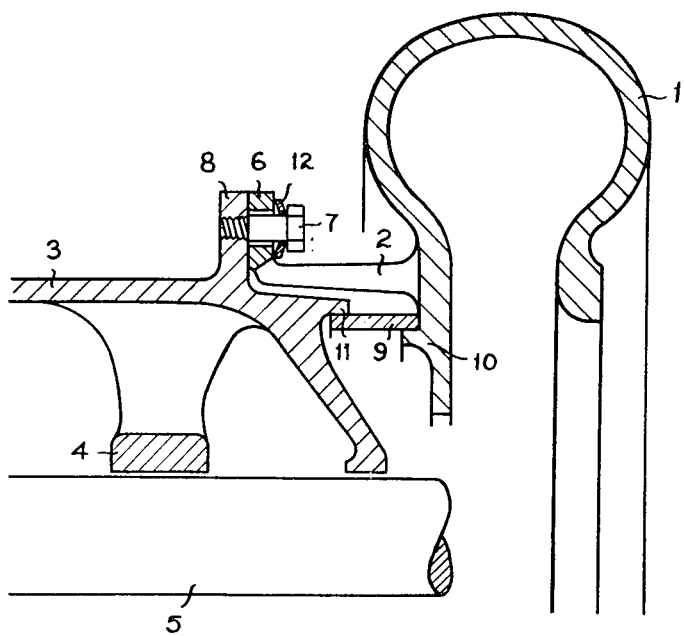

3,632,118

DEVICE FOR MAKING A CENTERING AND SEALING JOINT BETWEEN HOT AND COLD PARTS OF A HOUSING

The present invention relates to a device for making a centering and sealing joint between a hot part of a housing and a colder one, which parts are arranged in axial alignment, and are held at the correct axial clearance from one another by spacer elements.

Joining a hot part of a housing to a colder one sometimes involves considerable difficulties on account of differing amounts of thermal expansion in the radial direction at the junction points. Exhaust-gas turbochargers and gas-turbines are attended for example by gas temperatures of about 700° C. or even more, above ambient temperature. If the gas-housing is cooled substantially by the ambient air only, its main mass assumes a temperature of 300° C. or even more, above that of a colder part of the housing which has to be joined to it, for example the compressor housing or the housing which carries the bearings.

There are various known forms of construction with the purpose of providing a centering and sealing joint between parts even in the presence of relatively great temperature differences. In one type of embodiment, the hot part of the housing and the colder one are so firmly joined together that their axial contact surfaces cannot move radially with respect to one another. This embraces screwed joints in which the hot housing presses outwards against the colder housing via a centering edge. In another kind of embodiment, the joint is so designed that the axial contact surfaces of the two parts of the housing can slide on one another. This embraces those forms of construction in which the axial joint forces are limited. These known solutions are attended by the disadvantage that the firm joint involves the action of destructive radial forces which cause detrimental deformation or cracks, or that after some time there is noticable wear on the contact surfaces of the sliding joint, leading to leaks.

The present invention is based on the problem of avoiding the disadvantages of known devices and providing a joint which is stiff enough to keep the housings to be joined centered against external forces, which opposes relative thermal expansion of the housings with only small internal radial forces, and which provides a reliable outward seal without any sliding surfaces. According to the invention, this problem is solved by a tubular thin-walled cylindrical joint-ring which at one end surrounds a cylindrical centering surface portion of the hot part of the housing, whereof the other end is surrounded by a cylindrical surface portion of the colder part of the housing, and whereof the ends exhibit such tolerances with respect to the centering surface portions of the two parts of the housing that at least during operation, the ends of the rings bear in sealing fashion against the centering edges as a result of the differing amounts of thermal expansion.

The invention will be explained in greater detail hereinafter with reference to a preferred embodiment as shown on the attached drawing, the single FIGURE of which is an axial half-section of a joint between the hot turbine runner-housing of a turbomachine and a colder part of the turbine-housing which carries bearings for the machine shaft.

With reference now to the drawing:

The hot runner-housing 1 is held by webs 2 at the correct axial clearance from the colder part 3 of the housing, which part carries a bearing 4 for the shaft 5. The webs 2 are provided with eyes 6 which are pressed with moderate force against the flange 8 of the part 3 of the housing by shouldered screws 7 with spring washers 12 placed beneath them, so that the said eyes can follow radial thermal expansion on the part of the runner-housing 1. In order to hold the hot runner-housing 1 and the part 3 of the housing in axial alignment, and especially to seal them with respect to one another during operation of the turbomachine, there is provided a tubular joint-ring 9 which at one end surrounds a cylindrical centering surface portion 10 of the runner-housing 1, and whereof the other end is surrounded by a cylindrical centering 11 of the colder part 3 of the housing.

The joint-ring 9 is intended to be thin-walled, i.e. its radial cross section is made as small as possible so that the ring acts as a heat-flux choke. As a result, it assumes at one end almost the temperature of the hot runner-housing 1, and at the other end its temperature is not appreciably above that of the colder part 3 of the turbomachine housing. From the hot to the cold end, the temperature of the ring at first drops quite sharply and then more gently, i.e. not entirely linearly with its axial extent. The heat-stresses which occur in the ring are insignificant.

The material of the ring is advantageously so chosen that its coefficient of thermal expansion agrees substantially with that of the hot part 1 of the housing. Besides, only small amounts of expansion occur in the colder part of the housing; however, small radial and tangential forces and stresses both in the housing and in the joint-ring correspond to a small difference in radial expansion between this centering edge and the ring.

The joint-ring complies in excellent fashion with the problem of outwardly sealing the housing with which it is in contact without any special demands having to be made on tolerances. The ring may bear with a good fit against the cylindrical centering surface portions, but it may also exhibit slight play with respect to the centering surface portions when the machine is cold in order to facilitate assembly and dismantling. When the hot runner-housing 1 heats up and expands upon being placed in operation, the play is eliminated and the ring firmly surrounds the centering surface portion 10 and is now heated at this end. The heat-flux in the ring causes the temperature at its other end to rise also, and the said other end expands until it bears in sealing fashion against the centering surface portion 11 of the colder part 3 of the housing, and is cooled there.

A tubular ring is relatively yielding with respect to forces acting omnilaterally on its ends, but very stiff with respect to forces acting in opposition on both its ends in a radial direction, and thus attempting to displace the two ends with respect to one another, seen in the direction of its axis. Consequently, such a ring is also highly suitable as a centering joint member. On the contrary, it is not required to preserve the axial clearance between the two parts of the housing, which would be difficult in view of its axial thermal expansion. It accordingly exhibits axial play, as may be seen from the drawing in that it is not bolted or otherwise secured fast to either the cold or hot housing parts 3, 1, and thus functions without any axial restraint. Maintenance of axial clearance between the cold housing part 3 and the hot housing part 1 devolves on the webs 2, which interconnect the cold and hot housing parts, and which may furthermore be specially cooled. They may also be replaced by elastic elements or articulations.

Since the joint-ring acts as a heat-flux choke, and thus its end which bears against the colder part of the housing remains relatively cool, it is prevented from being undesirably heated. Thus the part 3 of the housing may, for example, be made of light metal without the joint to the hot runner-housing 1 leading to the risk of temperature damage.

A suitable material for the hot runner-housing 1 and for the tubular joint-ring 9 is a high-alloyed cast iron containing 3% C, 2% Si, 2% Cr and 20% Ni which is known under the trademark "Ni-Resist." The coefficient of linear thermal expansion, measured in m./m.C° is about $20 \times 10^{-6}$.

For the colder part of the housing 3, ordinary cast iron is suitable, the coefficient of linear thermal expansion being about $11 \times 10^{-6}$.

I claim:

1. A gas turbine machine comprising a first turbine runner-housing component which operates at high temperature due to the heat imparted thereto by the hot gas passing through the turbine, a second housing component of said machine located adjacent said turbine runner-housing and coaxially therewith, said housing component having a coefficient of linear thermal expansion greater than that of said second housing component, and said second housing component serving as an enclosure for a colder part of said machine, means connecting said first and second housing components together in axially spaced relation, said first housing component being provided with a coaxially extending cylindrical centering surface portion, said second housing component being also provided with a coaxially extending cylindrical centering surface portion having a radius greater than that of said cylindrical centering surface portion on said first housing component, and a relatively thin-walled cylindrical joint-ring extending between said cylindrical centering surface portions on said housing components and which has a coefficient of linear thermal expansion substantially the same as that of said first housing component, one end portion of said joint-ring surrounding and engaging said cylindrical centering surface portion of said first housing component and the opposite end portion of said joint-ring being surrounded by and engaging said cylindrical centering surface portion of said second housing component, said joint-ring being expandable in an axial direction and also expandable in a radial direction as a result of heat imparted thereto from said hot first housing component thereby to establish a combined sealing and mutual centering engagement as between the opposite end portions of said joint-ring and the cylindrical surface portions of said first and second housing components respectively engaged therewith, and said joint-ring due to its thin-wall character also serving as a heat-choke inhibiting flow of heat therethrough from said hot first housing component to said colder second housing component.

* * * * *

UNITED STATES PATENT OFFICE
CERTIFICATE OF CORRECTION

Patent No. 3,632,118          Dated January 4, 1972

Inventor(s)    Hans Herger

It is certified that error appears in the above-identified patent and that said Letters Patent are hereby corrected as shown below:

In the claim, line 6, --- first --- should be inserted after "said"

Signed and sealed this 16th day of May 1972.

(SEAL)
Attest:

EDWARD M. FLETCHER, JR.          ROBERT GOTTSCHALK
Attesting Officer                 Commissioner of Patents